United States Patent
Winslow et al.

(10) Patent No.: US 6,232,255 B1
(45) Date of Patent: May 15, 2001

(54) OLEFIN POLYMERIZATION CATALYST SYSTEM

(75) Inventors: Linda N. Winslow, Cincinnati, OH (US); Garry L. Fields, Seneca, IL (US); Kenneth W. Johnson, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/397,375

(22) Filed: Sep. 16, 1999

(51) Int. Cl.⁷ ............... B01J 21/00; B01J 21/06; B01J 21/10
(52) U.S. Cl. ............ 502/103; 502/125; 502/156; 526/153; 526/154; 526/123.1; 526/124.2
(58) Field of Search ................. 502/103, 125, 502/156; 526/123.1, 124.2, 153, 154

(56) References Cited

U.S. PATENT DOCUMENTS

| | | | |
|---|---|---|---|
| 4,349,648 | 9/1982 | Jorgensen et al. | 526/125 |
| 4,374,753 * | 2/1983 | Pullukat et al. | 252/429 |
| 4,378,304 | 3/1983 | Dombro | 252/429 B |
| 4,564,647 | 1/1986 | Hayashi et al. | 523/211 |
| 4,806,433 * | 2/1989 | Sasaki et al. | 502/115 |
| 4,833,111 | 5/1989 | Nowlin | 502/107 |
| 4,870,043 * | 9/1989 | Matsuura et al. | 502/116 |
| 4,888,318 | 12/1989 | Allen et al. | 502/105 |
| 4,981,929 | 1/1991 | Hussein et al. | 526/125 |
| 5,330,951 * | 7/1994 | Mink et al. | 502/115 |
| 5,883,204 * | 3/1999 | Spencer et al. | 526/134 |
| 6,063,727 * | 5/2000 | Fushimi et al. | 502/125 |

OTHER PUBLICATIONS

Noshay et al. "Transition Metal Catalyzed Polymerizations–Ziegler–Natta and Matathesis Polymerizations" Cambridge University Press, New York, New York, Quirk et al., ED, pp. 396–419, 1988.*

* cited by examiner

*Primary Examiner*—Mark L. Bell
*Assistant Examiner*—Michael J. DiVerdi
(74) *Attorney, Agent, or Firm*—William A. Heidrich; Gerald A. Baracka

(57) ABSTRACT

A catalyst system for the polymerization of olefins which includes a solid catalyst component and a cocatalyst. The solid catalyst component includes the contact product of silica, an alkyl magnesium-containing species, a compound having the structural formula $E(YZ)_m X_{4-m}$, where E is an atom of an element of Group 14 of the Periodic Table of the Elements; Y is an atom of an element of Group 16 of the Periodic Table of the Elements; Z is hydrogen, hydrocarbyl or mixtures thereof; X is hydrogen, halogen, hydrocarbyl or mixtures thereof; and m is an integer of 1 to 4 and a tetravalent titanium compound. The cocatalyst includes a mixture of at least two compounds having the structural formula $AlR_x X^1_{3-x}$, where R is the same or different and is hydrocarbyl; $X^1$ is halogen; and x is an integer of 1 to 3 with the proviso that at least one of the compounds is defined by x being 3 and at least one of the compounds as defined by x being 1 or 2.

25 Claims, No Drawings

OLEFIN POLYMERIZATION CATALYST SYSTEM

BACKGROUND OF THE DISCLOSURE

1. Field of the Invention

The present invention is directed to an olefin polymerization catalyst system. More particularly, the present invention is directed to an olefin polymerization system which provides improved catalytic activity and permits the synthesis of polymers having improved processability.

2. Background of the Prior Art

The continual development of new applications of olefin polymers has necessitated the development of new processes, employing new catalyst systems, to improve productivity in this highly competitive market. Thus, there is a continuing need to improve catalyst components and catalyst systems to improve their activity as well as to provide improved olefin polymers.

The development of new ethylene polymers, for example, linear low density polyethylene, has been very much welcomed in the marketplace. The applications to which linear low density polyethylene is put continues apace. The development of linear low density polyethylene, however, has not been free of difficulties. Processability of linear low density polyethylene and other ethylene polymer products remains a concern. That is, the high degree of polymerization, as manifested by ethylene polymer melt index, makes difficult the processing of these polymers.

Yet another objective in the development of catalyst systems is manufacturing olefin polymers, especially ethylene polymers, having narrow molecular weight distribution. This property is manifested by melt index ratio (MIR). The MIR, quantitatively determined as the ratio of melt index under high load to melt index under normal load, is desirably low to ensure a narrow molecular weight distribution.

Various catalyst components and catalyst systems have been developed to provide one or more of these properties. It is obvious, however, that the development of a new catalyst system which provides all of the aforementioned goals would be very much welcomed.

U.S. Pat. No. 4,349,648 describes a catalyst composition which comprises a precursor composition formed by dissolving at least one titanium compound, at least one magnesium compound and at least one electron donor. Although the titanium-containing compound can be a multiplicity of compounds, the magnesium compound is limited to a magnesium dihalide of which magnesium chloride is most preferred. The electron donor may be an alkyl ester of an aliphatic or an aromatic carboxylic acid, an aliphatic ether, a cyclic ether or an aliphatic ketone. The precursor composition is activated by contact with an organoaluminum compound. The '648 patent indicates that a mixture of a dihydrocarbylaluminum halide and a trihydrocarbylaluminum present in the molar ratio of at least 4:1 but not more than 20:1 produces copolymers processable into films having improved optical properties. More preferably, this molar ratio of dihydrocarbylaluminum halide compound to trihydrocarbylaluminum compound is in the range of from 5:1 to 15:1.

U.S. Pat. No. 4,833,111 discloses a silica supported catalyst employed in the polymerization of olefins. In the formation of this supported catalyst component, an organomagnesium compound, preferably dibutyl magnesium, is disposed upon the silica support followed by contact with an alkanol, preferably ethanol. The thus prepared composition is thereupon contacted with a transition metal compound which is usually a vanadium or a titanium compound. Most preferably this transition metal compound is titanium tetrachloride. The product of this contacting step is, in turn, contacted with an alkyl aluminum halide. The preferred alkyl aluminum halides include ethylaluminum dichloride or diethylaluminum chloride. The thus formed catalyst composition is activated with trimethyl aluminum.

U.S. Pat. No. 4,981,929 sets forth a catalyst system for the production of highly stereospecific olefin polymers. The olefin polymerization catalyst system disclosed in the '929 patent includes a solid titanium-containing procatalyst, an organoaluminum compound activator and a selectivity controlling agent. The solid titanium-containing procatalyst is obtained by reacting a magnesium compound having the formula $MgR_1R_2$, where $R_1$ is alkoxy or aryloxy; $R_2$ is alkoxy, aryloxy or halogen, with a halide of a tetravalent titanium compound in the presence of a halohydrocarbon and an electron donor in the liquid phase. The thus formed halogenated reaction product is thereupon contacted with a tetravalent titanium compound.

The organoaluminum activator compound of the '929 catalyst system may be triethylaluminum. The selectivity control agent of that system preferably is ethyl p-ethoxy benzoate or p-ethyl anisate. To this catalyst system is added a dialkylaluminum halide. Stoichiometric aspects of the catalyst system include an aluminum, in the organoaluminum activator compound, to titanium, in the cocatalyst, molar ratio in the range of 40:1 and 100:1. The molar ratio of dialkyaluminum halide to titanium is in the range of 5:1 to 25:1.

U.S. Pat. No. 4,888,318 teaches a catalyst system for the polymerization of olefins. The catalyst system includes a catalyst component and a cocatalyst activator. The catalyst component includes an inert carrier, preferably silica, dried at elevated temperature, followed by contact with an aluminum or zinc alkyl compound. The resultant product is contacted with a magnesium-containing compound, preferably magnesium dichloride. Thereupon the titanium compound, preferably titanium trichloride, is reacted with the thus formed product. Finally, an electron donor, which also acts as the solvent in the preparation mixture, is added. The catalyst system of the '318 patent also includes a cocatalyst component, trimethylaluminum. Of particular interest are three examples included therein as Example 4 which utilized mixtures of diethylaluminum chloride followed by addition of tri-n-hexyl aluminum to partially activate the catalyst component.

U.S. Pat. No. 4,378,304 comprise an olefin polymerization catalyst system in which a catalyst component is formed by disposing a dialkyl magnesium compound on a silica or an alumina support. The thus formed product is contacted with water or alcohol such that the molar ratio of water or alcohol to magnesium is in the range of between about 0.8 and 1.0. The water- or alcohol-contacted product is contacted with a transition metal compound of Group IVB and/or VB of the Periodic Table. In a preferred embodiment the transition metal compound is titanium tetrachloride, providing a titanium to magnesium molar ratio of about 0.8 to 1.0. The thus formed catalyst component is combined with a cocatalyst which may be one of many aluminum-containing compounds of which triisobutylaluminum is preferred. However, the cocatalyst may also be diethylaluminum chloride.

U.S. Pat. No. 4,564,647 discloses an ethylene polymerization catalyst comprising (A) a contact treatment product of (a) a high activity catalyst component and (b) a filler; and (B) an organoaluminum compound. The '647 patent also describes a further embodiment of the catalyst which includes, as a third component, (C) a filler having an affinity, equal to or higher than the filler (b), for polyethylene.

The high activity catalyst component (a) includes a hydrocarbon soluble transition metal compound, which preferably is a tetravalent titanium compound, reacted with a fatty acid salt, a alcoholic salt or a long chain aliphatic hydrocarbon group-containing phosphoric acid salt of magnesium or manganese. Alternatively, the high activity catalyst component (a) can be a cyclopentadienyl compound having the formula $(Cp)MR^1R^2R^3$, where Cp is a cyclopentadienyl group; M is titanium, vanadium, zirconium or hafnium; and $R^1$, $R^2$ and $R^3$ are independently $C_1-C_6$ alkyl, a cyclopentadienyl group, halogen or hydrogen.

The filler (b) is chosen depending upon the polyethylene composition desired. The filler may be a metal, a metal oxide, a metal carbonate, a carbonaceous substance, a ceramic, an organic pigment or a solid foaming agent.

Component (B) is an organoaluminum compound which may be one or more compounds having the general formula $R'_mAlX'_{3-m}$, where R' is $C_1-C_6$ alkyl, a cycloalkyl or an aryl; X' is halogen; and m is a positive real number of 3 or less, specifically 1, 1.5, 2 or 3. Examples given of organoaluminum compounds include trialkylaluminum compounds and dialkylaluminum monohalides. A mixture of triethylaluminum and diethylaluminum chloride is given to exemplify a cocatalyst within the scope of the '647 patent.

SUMMARY OF THE INVENTION

A new catalyst system has been developed which provides enhanced olefin polymerization catalytic activity and improved hydrogen response as indicated by decreased melt viscosity as manifested by the manufacture of olefin polymers having higher melt indices than heretofore obtainable.

In accordance with the present invention a catalyst system is provided which includes a solid catalyst component and a cocatalyst. The solid catalyst component includes the contact product of silica, an alkylmagnesium-containing species, a compound having the structural formula $R(YZ)_mX_{4m}$ where E is an atom of an element of Group 14 of the Periodic Table of the Elements; Y is an atom of an element of Group 16 of the Periodic Table of the Elements; Z is hydrogen, hydrocarbyl or mixtures thereof; X is hydrogen, halogen, hydrocarbyl or mixtures thereof; and m is an integer of 1 to 4 and a tetravalent titanium compound. The cocatalyst comprises a mixture of at least two compounds having the structural formula $AlR_xX^1_{3-x}$, where R is the same or different and is hydrocarbyl; $X^1$ is halogen; and x is an integer of 1 to 3 with the proviso that at least one of the compounds is defined by x being 3 and at least one of the compounds is defined by x being 1 or 2.

DETAILED DESCRIPTION

The catalyst system of the present invention includes a solid catalyst component formed by contacting silica with a alkyl magnesium-containing species. The silica, which acts as a support, is preferably free of impurities. However, silica containing minor amounts of other inorganic oxides is within the scope of the present invention. In general, the support comprises at least about 90% to about 95% by weight pure silica. More preferably, the support is at least 99% by weight pure silica.

The silica employed in the catalyst component of the present invention preferably has a surface area of from about 50 to about 500 $m^2/g$, a particle size of from about 10 to about 200 microns and a pore volume of about 0.5 to about 3.5 cc/g, as determined by standard B.E.T. measurements.

In a preferred embodiment, the silica employed as a support for the catalyst component of the present invention is treated to reduce its surface hydroxyl group concentration. One method of reducing surface hydroxyl group concentration is to contact the silica with an organosilicon compound. Organosilicon compounds useful in this application are described in U.S. Pat. Nos. 4,374,753 and 4,530,913. These patents are incorporated herein by reference. Typically, the surface hydroxyl group concentration of silica after treatment with an organosilicon compound ranges from about 0.3 to about 1.2 millimoles (mmol) per gram of silica.

Among the organosilicon compounds that are preferably employed in contacting the silica support are those having the structural formulae: $(R^5_3Si)_2NH$, $R^5_3Si(OR^5)$, $R^5_3SiX^3$ and $(R^5_3Si)_2O$ where $R^5$ is the same or different and is $C_1-C_{20}$ saturated hydrocarbyl; and $X^3$ is halogen. Preferred classes of compounds within the scope of these generic formulae include hexaalkyl disilazane, trialkylsilyl ethoxides and alkyl chlorosilanes. Of these, hexaalkyl disilazanes are particularly preferred with hexamethyl disilazane (HMDS) being especially preferred.

The silica support, after chemical treatment with an organosilicon compound, is preferably calcined. When this optional step occurs, the organosilicon compound treated silica is heated, in an inert atmosphere, at a temperature of at least about 50° C. More preferably, calcining occurs at a temperature in the range of between about 150° C. and about 650° C. The inert atmosphere is preferably provided by nitrogen or argon. Alternatively, the organosilicon-contacted silica may be dried by exposing the silica to a vacuum.

It is emphasized that reduction in silica surface hydroxyl concentration, alternatively, can be accomplished by calcination in accordance with the above procedure without treatment with an organosilicon compound.

The silica which is preferably treated to reduce its surface hydroxyl group concentration is thereupon contacted with a dialkyl magnesium-containing species. The dialkyl magnesium-containing species may be a compound or a complex having the formula $R^1R^2Mg$ or $R^1R^2Mg.nAlR^3_3$. where $R^1$ and $R^2$ are the same or different and are $C_1-Cl_2$ alkyl; $R^3$ is the same or different and is $C_1-C_{12}$ alkyl; and n is a number from about 0.05 to about 2. Especially preferred dialkyl magnesium-containing species include dibutyl magnesium, butylethyl magnesium and a complex of dibutyl magnesium and triethylaluminum.

The preferred concentration of dialkyl magnesium species disposed upon the silica support is in the range of between about 0.01 and about 10 mmol per gram of silica support. More preferably, the concentration of dialkyl magnesium-containing species is in the range of between about 0.5 and about 1 mmol per gram of silica support.

Contact between the dialkyl magnesium-containing species and the silica support preferably occurs in a hydrocarbon liquid which, in a preferred embodiment, is heptane or hexane. It is preferable that this contact occur at a temperature in the range of between about 15° C. and about 120° C. over a time period of between about 5 minutes and about 20 hours. More preferably, contact between the dialkyl magnesium compound or complex and the silica support occurs at a temperature in the range of between about 20° C. and about 40° C. over a time period of between about 30 minutes and about 1 hour.

To the thus contacted silica support is added a compound having the structural formula $E(YZ)_mX_{4-m}$, where E is an atom of an element of Group 14 of the Periodic Table of the Elements; Y is an atom of an element of Group 16 of the Periodic Table of Elements; Z is hydrogen, hydrocarbyl or mixtures thereof; X is hydrogen, halogen, hydrocarbyl or mixtures thereof; and m is an integer of 1 to 4. The compound having the structural formula $E(YZ)_m X_{4-m}$ is preferably contacted with the magnesium-contacted support in a hydrocarbon liquid of the type utilized in the step of contacting the magnesium-containing compound with the silica support. The temperature and duration of contact is also in accordance with the temperature and duration of contact between the magnesium-containing compound and the silica support.

In a preferred embodiment the compound having the formula $E(YZ)_m X_{4-m}$ is characterized by E being carbon, silicon or germanium; Y being oxygen, sulfur or selenium; Z being hydrogen or $C_1-C_{12}$ alkyl; and Z being hydrogen.

In a particularly preferred embodiment of the present invention, the compound having the structural formula $E(YZ)_m X_{4-m}$ is characterized by E being carbon or silicon; and Y being oxygen. That is, in a particularly preferred embodiment of the present invention the compound having the structural formula $E(YZ)_m X_{4-m}$ has at least one carbon atom to oxygen atom or one silicon atom to oxygen bond. Of these compounds, alkanols containing 1 to 12 carbon atoms and hydrocarbyloxysilanes are particularly preferred.

Turning to the first of these preferred classes of compounds, the alkanols, an alkanol having 1 to 4 carbon atoms is preferred for use in the formation of the catalyst of the present invention. Of the alkanols having 1 to 4 carbon atoms, n-butanol is particularly preferred.

Among the hydrocarbyloxysilanes, those silanes wherein at least one of the hydrocarbyloxy groups is an alkoxy group are particularly preferred. It is emphasized that the number of alkoxy groups attached to the silicon atom in the alkoxysilane is not critical. Thus, silanes containing 1 to 4 alkoxy groups bonded to the silicon atom may be utilized. However, in the case where less than 4 alkoxy groups are attached to the silicon atom, it is preferred that the other groups bonded to silicon be hydrocarbyl groups such as $C_1-C_4$ alkyl or phenyl. The alkoxy groups included in the alkoxysilane are most preferably methoxy or ethoxy groups. Particularly preferred silanes utilized in this application include trimethylethoxysilane, dimethyldiethoxysilane, methyltriethoxysilane, tetraethoxysilane (TEOS), diisopropyldimethoxysilane (DIPS), tetrabutoxysilane (TBOS), isopropylisobutyldimethoxysilane (IPIB) and methyltriethoxysilane (MTEOS). Of these, DIPS, TEOS and TBOS are particularly preferred.

The concentration of a compound having the structural formula $E(YZ)_m X_{4-m}$ contacted with the organomagnesium-containing support is in the range of between about 0.5 and about 10 mmol per gram of the support. More preferably, the concentration of the compound having the formula $E(YZ)_m X_{4-m}$ is in the range of between about 0.1 mmol and about 10 mmol per gram of the support. Still more preferably, the compound having the structural formula $E(YZ)_m X_{4-m}$ is in the range of between about 0.1 mmol and about 1.0 mmol per gram of support. Even still more preferably, the concentration of the compound having the structural formula $E(YZ)_m X_{4-m}$ is in the range of between about 0.4 mmol and about 1.0 mmol per gram of support.

The step of contacting the organomagnesium-containing support with the compound having the structural formula $E(YZ)_m X_{4-m}$ usually occurs at a temperature in the range of between about 15° C. and about 120° C. for a period of between about 5 minutes and 1.5 hours. More preferably, this contacting step occurs at a temperature in the range of between about 20° C. and about 40° C. over a time period of from about 0.5 hour and about 1 hour.

The thus contacted support is next contacted with a tetravalent titanium compound. It is preferred that the tetravalent titanium compound have the structural formula $Ti(OR^4)_y X^2_{4-y}$, where $R^4$ is the same or different and is alkyl, aryl, alkaryl, aralkyl or alkylsilyl; $X^2$ is halogen; and y is 0 or an integer of 1 to 4. More preferably, $R^4$ is alkyl; $X^2$ is chlorine or bromine; and y is 0, 1 or 2. Still more preferably, y is 0. In the most preferred embodiment of the present invention, the titanium compound is titanium tetrachloride.

The conditions under which contact with the titanium compound occur are substantially identical with the conditions accompanying contact between the two earlier described contacting steps. Thus, contact with the tetravalent titanium compound usually occurs at a temperature in the range of between about 15° C. and about 120° C. for a period of between about 5 minutes and about 3 hours. More preferably, this contact occurs at a temperature in the range of between about 20° C. and about 40° C. for a period of between about 0.5 hour and about 1.0 hour.

The cocatalyst of the present invention comprises at least two aluminum-containing compounds. The first aluminum-containing compound has the structural formula $AlR_x X^1_{3-x}$, where R is the same or different and is hydrocarbyl; $X^1$ is halogen; and x is an integer of 1 or 2. The second aluminum-containing compound has the structural formula $AlR_3$, where R has the meaning given above.

In a preferred embodiment the first aluminum-containing compound having the structural formula $AlR_x X^1_{3-x}$ is characterized by R being the same or different and being $C_1-C_6$ alkyl; and X being chlorine or bromine. The second aluminum-containing compound having the structural formula $AlR_3$ is defined by R being $C_1-C_6$ alkyl.

Still more preferably, the first aluminum-containing compound having the structural formula $AlR_x X^1_{3-x}$ is defined by R being the same or different and being $C_1-C_4$ alkyl; and $X^1$ being chlorine. The second aluminum-containing compound having the structural formula $AlR_3$ is characterized as being $C_1-C_4$ alkyl.

It is particularly preferred that the first aluminum-containing compound be characterized by R being $C_2-C_4$ alkyl; and x being 3 and the second aluminum-containing compound by R being $C_2-C_4$ alkyl. Particularly preferred species of the first aluminum-containing compound include diethylaluminum chloride (DEAC), diisopropylaluminum chloride, di-n-propylaluminum chloride, di-n-butylaluminum chloride, and the like. Particularly preferred species within the scope of the second aluminum-containing compound include triethylaluminum (TEAL) and triisobutylaluminum (TIBAL).

In a preferred embodiment, the molar ratio of the first aluminum-containing compound to the second aluminum-containing compound is in the range of between about 0.5:1 and about 3.8:1. More preferably, this molar ratio is in the range of between about 1:1 and about 3.5:1. Still more preferably, the molar ratio of the first to the second aluminum-containing compounds is in the range of between about 2:1 and about 3.25:1. Most preferably, the molar ratio of the first aluminum-containing compound to the second aluminum-containing compound is about 3:1.

The following examples are given to illustrate the scope of the present invention. Since these examples are given for illustrative purposes only, the invention should not be deemed limited thereto.

EXAMPLE 1

Preparation of Solid Catalyst Component

Silica (Davison®948) was treated with 20 wt. % hexamethyl disilazane (HMDS). The silica was thereupon placed in a quartz glass tube equipped with a glass frit and subjected to a stream of nitrogen gas. The silica in the glass tube was thereupon dried in a vertical tube furnace at 200° C.

The thus prepared silica (3.99 g) was placed in a 3-neck round bottom flask with a paddle type stirrer. The left and right vent of the flask were fitted with a nitrogen source and a vent to a mineral oil bubbler, respectively. The vent was also used to add the ingredients and to remove the finished catalyst. Liquid heptane (20 ml) was added to the silica to form a slurry which was stirred at about 160 rpm. A solution of 0.5 M Magala® 7.5 E, a complex of n-dibutyl magnesium and triethylaluminum wherein there are 7.5 moles of dibutyl magnesium for each mole of triethylaluminum, in heptane (4.8 ml) providing 2.4 mmol dibutyl magnesium per gram silica was added thereto. After stirring for 1 hour at ambient temperature a solution of 0.5 M n-butanol in heptane (4.0 ml) providing 2.0 mmol n-butanol per gram silica was added to the flask. Again, the slurry was stirred for 1 hour at ambient temperature at which time a solution of 1.0 M titanium tetrachloride in heptane (2.0 ml) providing 2.0 mmol $TiCl_4$ per gram silica was added thereto. After stirring for 1 hour at ambient temperature the heptane in the slurry was distilled off under an atmosphere of nitrogen at 100° C.

EXAMPLE 2

Gas Phase Formation of Linear Low Density Polyethylene

A sample of the catalyst component prepared in Example 1 (130 mg) was introduced into a gas phase polymerization reactor (3.3 liters) equipped with a helical agitator, a thermocouple and a valve for removing residual polymer. The reactor included a water jacket to provide temperature control. In this polymerization the reactor was maintained at 82° C. A solution of 1.6 M triethylaluminum (TEAL) in heptane (1.0 ml) and a solution of 1.5 M diethylaluminum chloride (DEAC) in heptane (0.5 ml) was added by syringe to the vessel. These solutions provided DEAC and TEAL in the reactor in a molar ratio of 1:2. The helical agitator was activated and nitrogen (175 psi) was added to the reactor. Next, hydrogen gas (13.3 psi), as measured by the total pressure in the vessel, was added to the reactor vessel. 1-Hexene (60 ml), introduced into the reactor by ethylene gas pressure, was next added to the reactor. Thereupon, ethylene gas was introduced into the reactor until the total pressure therein reached 300 psi.

At this point polymerization began by the introduction of gaseous ethylene and liquid 1-hexane at a 1-hexane-ethylene mass ratio of 0.125:1. Polymerization continued until 300 grams of gaseous ethylene, subsequent to obtaining of a total pressure of 300 psi, was introduced into reactor. At that time polymerization was discontinued. The duration of polymerization of this example was 188 minutes.

The copolymer of ethylene and hexene product of this polymerization reaction, commonly referred to as linear low density polyethylene (LLDPE), was weighed to determine catalytic activity in grams of polymer per gram of catalyst per hour was calculated. The LLDPE product was analyzed in accordance with ASTM Standard Procedure D-1238 to determine its melt index. In addition, the density of the ethylene copolymer was determined in accordance with ASTM Test Procedure D-1505.

Melt elasticity (ER), a physical property of a polymer, described in R. Shroff et al., *J. Appl. Poly. Sci.*, 57, 1605–1626 (1995), incorporated herewith by reference, was next determined. ER is an excellent indicia of polymeric tear strength an important property of polymers utilized as films. Since LLDPE finds important application as a film, this property is important. Those skilled in the art are aware that the lower the ER, the greater the tear strength.

Molecular weight distribution, another characteristic of a polymer was also determined for the LLDPE product of this example. That property is mathematically equal to the ratio of the weight average molecular weight ($M_w$) to the number average molecular weight ($M_n$). That distribution ratio is determined by gel permeation chromatography.

The results of these tests are-incorporated in Table 1 below.

EXAMPLES 3 AND 4

Gas Phase Formation of Linear Low Density Polyethylene

Example 2 was reproduced in two additional polymerization reactions, denoted as Examples 3 and 4, which differed from Example 1 only insofar as the weight of the catalyst component produced in Example 1 that was introduced into the gas phase reactor in Examples 3 and 4 was 120 mg and 95 mg, respectively, and, more significantly, the DEAC and TEAL constituents of the cocatalyst were 0.8 ml of a solution of 1.5 M DEAC in heptane and 0.8 ml of a solution of 1.6 M TEAL in heptane in Example 3 and 1.0 ml of a solution of 1.5 M DEAC in heptane and 0.5 ml of a solution of 1.6 M TEAL in heptane.

A summary of Examples 3 and 4 is included in Table 1.

COMPARATIVE EXAMPLES 1 AND 2

Gas Phase Formation of Linear Low Density Polyethylene

The polymerization of Example 2 was reproduced with the minor change that the weight of the catalyst component prepared in accordance with Example 1 changed into the gas phase reactor was 128 mg in Comparative Example 1 and 124 mg in Comparative Example 2. Of greater significance was the inclusion of only one organoaluminum compound as the cocatalyst in each of these examples. In Comparative Example 1 only TEAL was introduced into the gas phase polymerization reactor as the cocatalyst. In Comparative Example 2 only DEAC was provided in the polymerization.

Details of the amounts of TEAL and DEAC utilized in Comparative Examples 1 and 2, as well as the results of these polymerization examples, are included in Table 1.

TABLE 1

Gas Phase Polymerization[1] of Ethylene and 1-Hexene

| Example No. | Cat. Comp. of Ex. No. 1 | DEAC/TEAL[2] | Catalyst Activity[3] | Hexene[4] | Melt Index[5] | ER[6] | Molecular Wt. Dist.[7] | Density[8] |
|---|---|---|---|---|---|---|---|---|
| 2 | 130 mg | 1:2 | 1160 | 12.7 | 2.09 | 1.04 | 4.5 | 0.9185 |
| 3 | 125 mg | 1:1 | 1450 | 13.2 | 2.13 | 0.96 | 4.6 | 0.9175 |
| 4 | 95 mg | 2:1 | 1710 | 14.0 | 2.24 | 0.96 | 4.4 | 0.9150 |
| CE1 | 128 mg | 0:1 | 1200 | 13.5 | 2.86 | 0.95 | 5.4 | 0.9187 |
| CE2 | 124 mg | 1:0 | 1220 | 12.7 | 0.354 | 2.10 | 4.1 | 0.9146 |

Footnotes:
[1]Conducted at 82° C. and 300 psig to polymerize 300 g ethylene.
[2]Molar ratio.
[3]Gm of LLDPE per gm of catalyst component per Hr.
[4]% by wt hexene in LLDPE.
[5]Pursuant to ASTM D-1238.
[6]Melt elasticity.
[7]Ratio of Mw/Mn.
[8]G/cm$^3$, as determined by ASTM D-2389.

EXAMPLE 5

Preparation of Solid Catalyst Component

Davison®948 silica (4.99 g) treated with HMDS, identical to that employed in the formation of the solid catalyst component of Example 1, was slurried in heptane (25 ml) in a flask of the type employed in Example 1. A solution of 0.63 M butylethyl magnesium in heptane (3.9 ml, 2.5 mmol/g) was added to the slurry followed by stirring for 1 hour at ambient temperature. Thereupon, a solution of 0.20 M tetraethoxysilane (TEOS) in heptane (3.0 ml, 0.6 mmol/g) was introduced into the flask followed by stirring for 1 hour at ambient temperature. In a final contacting step, a solution of 0.44 M titanium tetrachloride (TiCl$_4$) in heptane (5.7 ml, 2.5 mmol/g) was disposed in the flask followed by stirring for 1 hour at ambient temperature. The heptane slurrying liquid was then distilled off under an atmosphere of nitrogen at a temperature of 100° C. leaving the solid catalyst component.

EXAMPLE 6

Gas Phase Formation of Linear Low Density Polyethylene

A sample of the catalyst component (109 mg) prepared in accordance with Example 5 was disposed in a gas phase reactor (3.3 l) identical to the reactor employed in Example 2. To this was added a 1.6 M solution of DEAC in heptane (0.6 ml) and a 0.32 M solution of TEAL in heptane (1.0 ml) such that the molar ratio of DEAC to TEAL was 3:1. To this was added nitrogen gas such that the pressure in the reactor was increased by 176 psi. Thereupon, hydrogen gas was added wherein the reactor pressure was increased by 13.1 psi. This was followed by addition of hexene (53 ml). Finally, ethylene gas was added to the reactor to bring the total pressure therein to 300 psig.

The temperature in the reactor was adjusted, by means of the water jacket feature of the reactor, to 82° C. That temperature was maintained during the duration of the polymerization reaction. At that point polymerization began with the continuous introduction of ethylene gas and liquid 1-hexene, at a 1-hexene to ethylene mass ratio of 0.126:1, into the reactor, maintained at a total pressure of 300 psig, until 300 grams of ethylene were consumed. At that time the polymerization was stopped.

The LLDPE product was weighed and analyzed to determine its melt index, density and melt elasticity in accordance with the tests set forth in Example 2.

This example is summarized in Table 2.

EXAMPLES 7, 8 AND 9

Gas Phase Formation of Linear Low Density Polyethylene

Three additional examples were conducted in accordance with the procedure used in Example 6 but for the exact weight of the catalyst component prepared in accordance with Example 5 and the volume of hexene. These weights of catalyst component and volumes of hexene of Examples 7, 8 and 9, which each included identical concentrations of DEAC and TEAL, are provided in tabular form in Table 2. Table 2 also summarizes the results of Examples 7, 8 and 9.

COMPARATIVE EXAMPLES 3, 4 AND 5

Gas Phase Formation of Linear Low Density Polyethylene

Three polymerizations were conducted in accordance with Example 6 but for the identity of the cocatalyst. Whereas the cocatalyst of Example 6 utilized DEAC and TEAL in a molar ratio of 3:1, the cocatalyst of the three polymerization denoted as Comparative Examples 3, 4 and 5 was exclusively TEAL.

The exact amount of TEAL utilized in each of these examples is summarized in Table 2. That table also reports the exact weight of catalyst component, prepared in accordance with Example 5, charged into the reactor as well as the exact volume of the comonomers, the only other aspects of the polymerization not conducted in exact accordance with Example 6.

TABLE 2

Gas Phase Polymerization[1] of Ethylene and 1-Hexene

| Example No. | Cat. Comp. of Ex. No. 5[2] | DEAC/ TEAL[3] | Cat Act[4] | Hexene[5] | Hexene/ Ethylene[6] | MI[7] | Density[8] | ER[9] |
|---|---|---|---|---|---|---|---|---|
| 6 | 109 | 3:1 | 1712 | 53 | 0.228 | 1.15 | 0.9152 | 0.99 |
| 7 | 84 | 3:1 | 1990 | 45 | 0.204 | 1.36 | 0.9168 | 1.03 |
| 8 | 102 | 3:1 | 1690 | 36 | 0.178 | 1.06 | 0.9197 | 0.95 |
| 9 | 108 | 3:1 | 1550 | 31 | 0.161 | 1.07 | 0.9212 | 0.98 |
| CE3 | 124 | 0:1 | 1380 | 53 | 0.228 | 0.726 | 0.9140 | 0.99 |
| CE4 | 126 | 0:1 | 1320 | 45 | 0.204 | 0.82 | 0.9176 | 0.97 |
| CE5 | 130 | 0:1 | 1390 | 63 | 0.254 | 0.87 | 0.9128 | 1.01 |

Footnotes:
[1]Conducted at 300 psig and 82° C. wherein 300 gm of ethylene was polymerized.
[2]In milligrams (mg) charged into reactor.
[3]Molar ratio.
[4]Gm of LLDPE Polymer per gm Catalyst Component per hr.
[5]In milliliters (ml) charged into reactor.
[6]Molar ratio of 1-hexene to ethylene charged into reactor.
[7]Melt index, calculated in accordance with ASTM D-1238.
[8]In, g/cm$^3$, calculated in accordance with ASTM D-1505.
[9]Melt elasticity.

EXAMPLE 10

Preparation of Catalyst Component

A catalyst component was prepared in accordance with the procedure of Example 1 but for the concentrations of the ingredients utilized therein. The solution of Magala® 7.5E complex of dibutyl magnesium and triethyl aluminum in heptane was present in an amount that provided 1.25 mmol/g of HMDS treated Davison® 948 silica. The n-butanol solution was provided in a concentration of 1.25 mmol/g silica and so too was the titanium tetrachloride solution.

EXAMPLE 11

Slurry Homopolymerization of Ethylene

Hydrogen gas (400 psi) from a 150 cc vessel was charged into a 2-liter reactor. Isobutane (800 ml) was thereupon introduced therein. This was followed by the addition of a solution of 1.58 M DEAC in heptane (0.6 ml) and a solution of 0.5 M TEAL in heptane (2.0 ml). Each of the two solutions provided 1 mmol of DEAC and TEAL. A sample of the catalyst component prepared in accordance with Example 10 (28 mg) was then added. Thereupon, ethylene was fed into the reactor until a total pressure of 550 psi was obtained.

The reactor was heated to a temperature of 90° C. at which time polymerization was initiated. During the 1 hour duration of the polymerization reaction the temperature remained constant at 90° C. while ethylene gas was continuously fed into the reactor to maintain a constant pressure of 550 psi.

At the end of the 1 hour polymerization, the polyethylene product was recovered. The weight of the polyethylene product was found to be 165.5 g. The melt index of the polyethylene, determined in accordance with ASTM D-1238, was found to be 0.81.

This example is summarized in Table 3.

EXAMPLE 12 AND COMPARATIVE EXAMPLE 6

Slurry Homopolymerization of Ethylene

Example 11 was repeated in two further ethylene polymerization reactions but for the amounts of the organoaluminum compounds utilized therein. In Example 12, the solution of 1.58 M DEAC in heptane was provided in a volume of 2.0 ml. The solution of 0.5 M TEAL in heptane (1.2 ml) remained unchanged. This provided 2 mmols DEAC and 1 mmol TEAL.

In Comparative Example 6 a single solution of 0.5 M TEAL in heptane was substituted for the two solutions of DEAC and TEAL of Example 11. This solution provided 1 mmol TEAL.

The product of Example 12 was 182 g polyethylene having a melt index of 1.34. The product of Comparative Example 6 was 142 g polyethylene having a melt index of 0.23.

These examples appear in Table 2.

TABLE 3

Slurry Homopolymerization of Ethylene[1]

| Example No. | DEAC[2] | TEAL[3] | Cat. Comp. of Ex. No. 10[4] | PE[5] | Activity[6] | MI[7] |
|---|---|---|---|---|---|---|
| 11 | 1 | 1 | 28 | 165 | 5911 | 0.81 |
| 12 | 2 | 1 | 30 | 182 | 6070 | 1.34 |
| CE6 | 0 | 1 | 38 | 142 | 3737 | 0.23 |

Footnotes:
[1]Slurry polymerization employing 400 psig H$_2$ at a total pressure of 550 psig and a temperature of 90° C. for 1 hour.
[2]Millimoles of diethylaluminum chloride provided by a 1.58 M solution in heptane.
[3]Millimoles of triethyl aluminum provided by 0.5 M solution in heptane.
[4]Milligrams of the catalyst component of Example No. 10.
[5]Grams of ethylene homopolymer produced.
[6]Catalytic activity in grams of ethylene homopolymer per gram of catalyst component per hour.
[7]Melt index pursuant to ASTM D-1238.

EXAMPLE 13

Preparation of Solid Catalyst Component

Davison® 948 silica was dried for 12 hours at a temperature of 200° C. and thereupon contacted with Magala® 7.5 E, a complex of dibutyl magnesium and triethyl aluminum, n-butanol and titanium tetrachloride in that order, in accordance with the manner described in Example 1. However, the molar concentration of the constituents were as follows:

Magala® 7.5E: 0.6 mmol/g. of silica; n-butanol: 0.5 mmol/g of silica; and TiCl$_4$: 0.5 mmol/g of silica.

EXAMPLE 14 AND COMPARATIVE EXAMPLE 7

Slurry Homopolymerization of Ethylene

Two polymerization reactions using the catalyst component made in accordance with Example 13 were conducted. The polymerizations were run in accordance with the procedure set forth in Example 11 but for the exact details of the cocatalyst and but for minor changes in the thermodynamic conditions accompanying the polymerization reaction. The polymerization occurred at a temperature of 100° C. and hydrogen was provided at a pressure of 260 psig from a 150 cc vessel.

In regard to the cocatalyst, Example 14 was conducted in the presence of a 0.5 M solution of TEAL in heptane (1 ml) and a 0.5 M solution of DEAC in heptane (1 ml). Comparative Example 7 was conducted in the presence of only a 0.5 M solution of TEAL in heptane (2 ml).

These examples are summarized in Table 4.

TABLE 4

Slurry Homopolymerization of Ethylene[1]

| Example No. | DEAC[2] | TEAL[3] | Cat. Comp. of Ex. No. 13[4] | Time[5] | PE[6] | Activity[7] | MI[8] |
|---|---|---|---|---|---|---|---|
| 14 | 1 | 1 | 31 | 63 | 12.4 | 400 | 0.6 |
| CE7 | 0 | 2 | 27 | 52 | 1.2 | 49 | NM[8] |

Footnotes:
[1]Slurry polymerization employing 260 psi H$_2$ at a total pressure of 550 psig and a temperature of 100° C.
[2]Diethylaluminum chloride, in millimoles, provided by a 0.5 M solution in heptane (1.0 ml).
[3]Triethylaluminum, in millimoles, provided by a 0.5 M solution in heptane (1.0 ml in Ex. No. 14 and 2.0 ml in Ex. No. CE7).
[4]Milligrams of the catalyst component of Example 13.
[5]Minutes.
[6]Grams of polyethylene produced.
[7]Catalytic activity in grams of PE per gram of catalyst component per hour.
[8]Melt index as measured by ASTM D-1238.
[9]Not measured because of insufficient sample.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A catalyst system comprising:
   (A) a solid catalyst component comprising the contact product of silica pretreated to reduce its surface hydroxyl concentration by contacting with an organosilicon compound and calcining; an alkyl magnesium-containing species; a compound having the structural formula E(YZ)$_m$X$_{4-m}$ where E is carbon, silicon or germanium; Y is oxygen, sulfur or selenium; Z is hydrogen or C$_1$–C$_{12}$ alkyl; X is hydrogen; and m is an integer of 1 to 4; and a tetravalent titanium compound; and
   (B) a cocatalyst comprising a mixture of at least two aluminum-containing compounds, said first aluminum-containing compound having the structural formula AlR$_x$X$^1_{3-x}$, were R is hydrocarbyl; X$^1$ is halogen; and x is an integer of 1 or 2 and said second aluminum-containing compound having the structural formula AlR$_3$, where R has the meaning given above the molar ratio of said first aluminum-containing compound to said second aluminum-containing compound ranging from 0.5:1 to 3.8:1.

2. A catalyst system in accordance with claim 1 wherein said silica is calcined at a temperature in the range of between about 150° C. and about 650° C.

3. A catalyst system in accordance with claim 1 wherein said silica is contacted with an organosilicon compound selected from the group consisting of (R$^5_3$Si)$_2$NH, R$^5_3$Si(OR$^5$), R$^5_3$SiX$^3$ and (R$^5_3$Si)$_2$O, where R$^5$ is C$_1$–C$_{20}$ saturated hydrocarbyl; and X$^3$ is halogen.

4. A catalyst system in accordance with claim 3 wherein said silica is contacted with a hexaalkyl disilazane.

5. A catalyst system in accordance with claim 1 wherein said alkyl magnesium-containing species is selected from the group consisting of compounds having the structural formula R$^1$R$^2$Mg where R$^1$ and R$^2$ are the same or different and are C$_1$–C$_{12}$ alkyl, and complexes having the structural formula R$^1$R$^2$Mg.nAlR$^3_3$, where R$^1$ and R$^2$ have the meaning given above; R$^3$ is C$_1$–C$_{12}$ alkyl; and n is from about 0.05 to about 2.

6. A catalyst system in accordance with claim 1 wherein said tetravalent titanium compound has the structural formula Ti(OR$^4$)$_y$X$^2_{4-y}$, where R$^4$ is alkyl, aryl, alkaryl, aralkyl or alkylsilyl; X$^2$ is halogen; and y is 0 or an integer of 1 to 4.

7. A catalyst system in accordance with claim 1 wherein R is C$_1$–C$_{12}$ alkyl; and X$^1$ is chlorine or bromine.

8. A catalyst system in accordance with claim 5 wherein R$^1$ and R$^2$ are C$_1$–C$_4$ alkyl.

9. A catalyst system in accordance with claim 1 wherein E is carbon or silicon; Y is oxygen or sulfur; Z is C$_1$–C$_4$ alkyl; and m is 1 or 4.

10. A catalyst system in accordance with claim 6 wherein R$^4$ is alkyl; X$^2$ is chlorine or bromine; and y is 0, 1 or 2.

11. A catalyst system in accordance with claim 10 wherein y is 0.

12. A catalyst system comprising:
    (A) a solid catalyst component comprising the product produced by the steps of:
        (a) contacting silica with a hexaalkyl disilazane and calcining at a temperature in the range between about 150° C. and 650° C.;
        (b) contacting the product of step(a) with an alkyl magnesium-containing species selected from the group consisting of R$^1$R$^2$Mg and R$^1$R$^2$Mg.nAlR$^3_3$, wherein R$^1$ and R$^2$ are C$_1$–C$_4$ alkyl; R$^3$ is C$_1$–C$_4$ alkyl; and n is a number from 0.05 to about 2;
        (c) contacting the product of step (b) with a compound having at least one carbon atom to oxygen atom bond or one silicon atom to oxygen atom bond;
        (d) contacting the product of step (c) with a titanium compound having the structural formula TiX$^2_4$, where X$^2$ is chlorine or bromine; and
    (B) a cocatalyst comprising a mixture of at least two different aluminum-containing compounds, said first aluminum-containing compounds having the structural formula AlRX$^1_{3-x}$, where R is C$_1$–C$_6$ alkyl; X$^1$ is chlorine; and x is an integer of 1 or 2 and said second aluminum-containing compound having the structural formula AlR$_3$ where R has the meaning given above, the molar ratio of said first aluminum-containing compound to said second aluminum-containing compound ranging from 0.5:1 to 3.8:1.

13. A catalyst system in accordance with claim 12 wherein said hexaalkyl disilazane is hexamethyl disilazane.

14. A catalyst system in accordance with claim 12 wherein $R^1$ is $C_2$–$C_4$ alkyl.

15. A catalyst system in accordance with claim 12 wherein said compound that contacts the product of step (b) is selected from the group consisting of alkanols containing 1 to 12 carbon atoms and hydrocarbyloxysilanes.

16. A catalyst system in accordance with claim 15 wherein said hydrocarbyloxysilane contains at least one alkoxy group.

17. A catalyst system in accordance with claim 12 wherein said titanium compound is titanium tetrachloride.

18. A catalyst system in accordance with claim 12 wherein R is $C_2$–$C_4$ alkyl.

19. A catalyst system in accordance with claim 18 wherein said ratio of said first aluminum-containing compound to said second aluminum-containing compound is in the range of between about 1:1 and about 3.5:1.

20. A catalyst system comprising:
   (A) a solid catalyst component comprising the product produced by the steps of:
      (a) contacting silica with a hexaalkyldisilazane and calcining at a temperature in the range between about 150° C. and about 650° C.;
      (b) contacting the product of step(a) with an alkyl magnesium-containing species from the group consisting of $R^1R^2Mg$ and $R^1R^2Mg.nAlR^3{}_3$, wherein $R^1$ and $R^2$ are $C_1$–$C_4$ alkyl; $R^3$ is $C_2$–$C_4$ alkyl; and n is a number from about 0.05 to about 2;
      (c) contacting the product of step (b) with a compound selected from the group consisting of n-butanol and tetraethoxysilane;
      (d) contacting the product of step (c) with titanium tetrachloride; and
   (B) a cocatalyst comprising a mixture of a first aluminum-containing compound having the structural formula $AlRX^1{}_{3-x}$, where R is $C_2$–$C_4$ alkyl; $X^1$ is chlorine; and x is 1 or 2 and a second aluminum-containing compound having the structural formula $AlR_3$, where R has the meaning given above, the molar ratio of said first aluminum-containing compound to said second aluminum-containing compound ranging from 0.5:1 to 3.8:1.

21. A catalyst system in accordance with claim 20 wherein said alkyl magnesium-containing species is selected from the group consisting of dibutylmagnesium, butylethyl magnesium and a complex of dibutyl magnesium and triethylaluminum.

22. A catalyst system in accordance with claim 21 wherein said cocatalyst is a mixture of diethylaluminum chloride and triethylaluminum.

23. A catalyst system in accordance with claim 22 wherein said mixture of diethylaluminum chloride and triethylaluminum is present in a molar ratio in the range of between about 2:1 and about 3.25:1.

24. A catalyst system in accordance with claim 23 wherein said molar ratio is about 3:1.

25. A catalyst system in accordance with claim 10 wherein $R^4$ is $C_1$–$C_4$ and $X^2$ is chlorine.

* * * * *